United States Patent
Sasaki et al.

(10) Patent No.: US 9,431,680 B2
(45) Date of Patent: Aug. 30, 2016

(54) ELECTRIC STORAGE DEVICE, ELECTRIC STORAGE SYSTEM, AND MANUFACTURING METHOD THEREOF

(71) Applicant: GS Yuasa International Ltd., Kyoto-shi (JP)

(72) Inventors: Takeshi Sasaki, Kyoto (JP); Taro Yamafuku, Kyoto (JP)

(73) Assignee: GS YUASA INTERNATIONAL LTD., Kyoto-shi, Kyoto (JP)

( * ) Notice: Subject to any disclaimer, the term of this patent is extended or adjusted under 35 U.S.C. 154(b) by 205 days.

(21) Appl. No.: 14/152,948

(22) Filed: Jan. 10, 2014

(65) Prior Publication Data
US 2014/0197796 A1    Jul. 17, 2014

(30) Foreign Application Priority Data

Jan. 11, 2013 (JP) ................................. 2013-004103
Dec. 16, 2013 (JP) ................................. 2013-259189

(51) Int. Cl.
*H01M 4/00* (2006.01)
*H01M 10/0587* (2010.01)
*H01M 10/04* (2006.01)
(Continued)

(52) U.S. Cl.
CPC ....... *H01M 10/0587* (2013.01); *H01M 2/0217* (2013.01); *H01M 2/263* (2013.01); *H01M 2/30* (2013.01); *H01M 10/049* (2013.01); *H01M 10/0431* (2013.01); *H02J 7/0068* (2013.01);
(Continued)

(58) Field of Classification Search
CPC ..... H01M 10/0587; H01M 4/60; H01M 6/10
USPC .......................................................... 429/94
See application file for complete search history.

(56) References Cited

U.S. PATENT DOCUMENTS 4,929,519 A * 5/1990 Catotti .................. H01M 4/622
                                                              429/222
5,925,482 A * 7/1999 Yamashita .............. H01M 2/34
                                                              429/130
(Continued)

FOREIGN PATENT DOCUMENTS

EP    2 083 464 A1    7/2009
JP    2001-76711 A    3/2001
(Continued)

OTHER PUBLICATIONS

Extended European Search Report dated May 14, 2014.

*Primary Examiner* — M'baye Diao
(74) *Attorney, Agent, or Firm* — McGinn IP Law Group PLLC

(57) ABSTRACT

An electric storage device includes: a rolled electrode assembly 10 formed by winding a positive electrode, a negative electrode, and a separator so as to have curved portions and linear portions; current collectors 7; and an electrolyte solution 3. A positive electrode substrate has at one end 10A an unformed portion 11E formed without a positive electrode mixture layer, and a negative electrode substrate has at the other end 10B an unformed portion 13E formed without a negative electrode mixture layer. The current collectors 7 are connected respectively to at least part of the linear portions in the unformed portion of the positive electrode at the one end 10A and that of the negative electrode at the other end 10B. The one end 10A in the positive electrode has a length greater than the winding length, and/or the other end 10B in the negative electrode has such a length.

20 Claims, 14 Drawing Sheets

(51) Int. Cl.
 *H02J 7/00* (2006.01)
 *H01M 2/02* (2006.01)
 *H01M 2/26* (2006.01)
 *H01M 2/30* (2006.01)
 *H01M 10/0525* (2010.01)

(52) U.S. Cl.
 CPC ..... *H01M 10/0525* (2013.01); *Y10T 29/49108* (2015.01)

(56) References Cited

U.S. PATENT DOCUMENTS

| | | | | |
|---|---|---|---|---|
| 5,965,295 | A * | 10/1999 | Bando | H01M 4/32 29/623.1 |
| 6,258,487 | B1 * | 7/2001 | Kitoh | H01M 10/05 429/231.8 |
| 7,273,674 | B1 * | 9/2007 | Frustaci | H01M 4/13 29/623.1 |
| 7,385,801 | B2 * | 6/2008 | Ando | H01G 9/016 361/503 |
| 7,597,995 | B2 * | 10/2009 | Yamauchi | H01M 2/1653 428/83 |
| 7,740,983 | B2 * | 6/2010 | Kihara | C01B 3/0057 429/218.2 |
| 7,867,654 | B2 * | 1/2011 | Fujihara | H01M 4/13 429/212 |
| 7,871,728 | B2 * | 1/2011 | Minami | H01M 2/263 429/231.1 |
| 7,943,253 | B2 * | 5/2011 | Inagaki | H01M 2/22 29/623.1 |
| 8,048,566 | B2 * | 11/2011 | Geng | B82Y 30/00 429/206 |
| 8,815,437 | B2 * | 8/2014 | Lee | H01M 2/0202 429/156 |
| 8,852,798 | B2 * | 10/2014 | Kim | H01M 2/14 429/163 |
| 2006/0024568 | A1 * | 2/2006 | Lee | H01M 2/14 429/130 |
| 2006/0286457 | A1 * | 12/2006 | Sasaki | H01M 4/525 429/231.3 |
| 2012/0301759 | A1 * | 11/2012 | Yoshitake | H01M 2/0237 429/94 |
| 2013/0344364 | A1 | 12/2013 | Nanaumi et al. | |

FOREIGN PATENT DOCUMENTS

| | | |
|---|---|---|
| JP | 2007-273390 A | 10/2007 |
| JP | 2012-138194 A | 7/2012 |
| JP | 2012-182343 A | 9/2012 |
| JP | 2012-195085 A | 10/2012 |
| WO | WO 2012/086690 A1 | 6/2012 |

* cited by examiner

F I G. 1 4
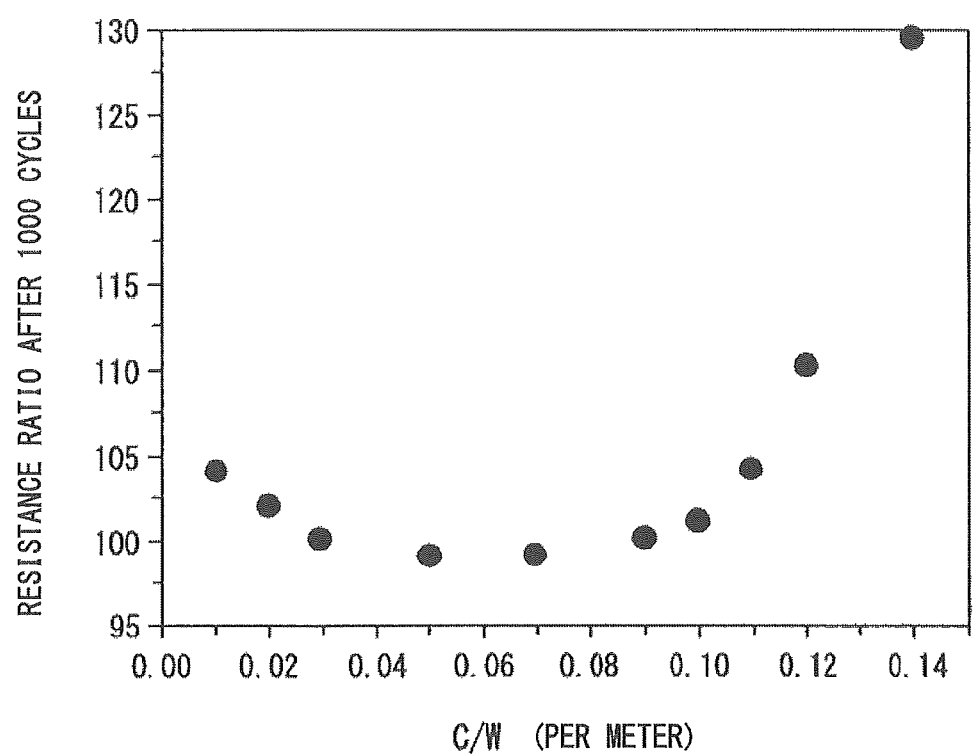

ELECTRIC STORAGE DEVICE, ELECTRIC STORAGE SYSTEM, AND MANUFACTURING METHOD THEREOF

CROSS-REFERENCE TO RELATED APPLICATIONS

This application claims the benefit of Japanese Patent Application Nos. 2013-004103 and 2013-259189, filed on Jan. 11, 2013 and Dec. 16, 2013, respectively, which are incorporated herein by reference.

FIELD

The present invention relates to an electric storage device, an electric storage system, and methods for producing the electric storage device and the electric storage system. More specifically, the present invention relates to an electric storage device and an electric storage system that each include an electrode assembly of a wound type formed by winding a positive electrode, a negative electrode, and a separator disposed between the positive electrode and the negative electrode together, and to methods for producing the electric storage device and the electric storage system.

BACKGROUND

Recently, rechargeable electric storage devices such as battery cells, e.g., lithium ion cells and nickel hydrogen cells, and capacitors, e.g., electric double layer capacitors, are employed as a power source for vehicles, e.g., cars and motorcycles, and various appliances, e.g., mobile terminals and laptop computers.

Such an electric storage device includes a housing, an electrode assembly of a wound type housed in the housing, two current collectors electrically connected to the electrode assembly and housed in the housing, and an electrolyte solution housed in the housing. The positive electrode and the negative electrode, which serve as electrodes constituting the electrode assembly, each have a side edge portion, in which an active material layer is not formed, along the winding direction on a metal foil. The side edge portion of the positive electrode is located at one end in the direction of the winding axis (extending along the winding direction), and the side edge portion of the negative electrode is located at the other end in the direction of the winding axis. The side edge portions of the positive electrode and the negative electrode are connected to the respective current collectors.

In such electric storage devices, there is a demand for impregnating the electrode assembly with the electrolyte solution, while reducing the amount of the electrolyte solution to be housed in the housing, from the viewpoint of a reduction in weight, a reduction in cost, or the like. As a technique for impregnating the electrode assembly with the electrolyte solution, JP 2012-195085 A and JP 2012-182343 A, for example, can be mentioned.

JP 2012-195085 A discloses a battery cell in which the junction states of the positive electrode and the negative electrode in their junction regions with the respective current collectors are made different from each other so that the electrode density is reduced, or the total junction area is reduced, in one of the junction regions of the positive electrode and the negative electrode with the respective current collectors, as compared to the other of the junction regions thereof. JP 2012-182343 A discloses an electric storage device in which metal foils of the positive electrode and the negative electrode are wound into an ellipsoidal shape, and parts of their side edge portions in the form of overlapping arcs are joined together.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In the above-mentioned electric storage devices of JP 2012-195085 A and JP 2012-182343 A, there are cases where a portion, serving to absorb the electrolyte solution, of the electrode assembly deforms, for example, when the electrode assembly is inserted into the housing, or when an impact is applied to the electric storage device. In such a case, supply shortages of the electrolyte solution to the electrode assembly occur, leading to increases in resistance.

In view of the above-mentioned problems, it is objects of the present invention to provide an electric storage device and an electric storage system configured to suppress the resistance from increasing due to the supply shortages of the electrolyte solution, and to provide methods for producing the electric storage device and the electric storage system.

An electric storage device according to the present invention includes: a housing; an electrode assembly in roll form housed in the housing, the electrode assembly being formed by winding a positive electrode, a negative electrode, and a separator disposed between the positive electrode and the negative electrode so as to have curved portions and linear portions continuous with the curved portions; current collectors housed in the housing, the current collectors being connected respectively to the positive electrode at one end in a direction of a winding axis of the electrode assembly and to the negative electrode at the other end in the direction of the winding axis of the electrode assembly; and an electrolyte solution housed in the housing, wherein the positive electrode includes a positive electrode substrate and a positive electrode mixture layer formed on the positive electrode substrate in a region excluding one end of the positive electrode substrate, the negative electrode includes a negative electrode substrate and a negative electrode mixture layer formed on the negative electrode substrate in a region excluding the other end of the negative electrode substrate, the positive electrode substrate has at its one end an unformed portion in which the positive electrode mixture layer is not formed, the negative electrode substrate has at its other end an unformed portion in which the negative electrode mixture layer is not formed, the current collectors are connected respectively to at least part of the linear portions in the unformed portion of the positive electrode at the one end in the positive electrode and to at least part of the linear portions in the unformed portion of the negative electrode at the other end in the negative electrode, and the one end in the positive electrode has a length greater than a winding length, and/or the other end in the negative electrode has a length greater than the winding length.

BRIEF DESCRIPTION OF DRAWINGS

The foregoing and other features of the present invention will become apparent from the following description and drawings of an illustrative embodiment of the invention in which:

FIG. 14 is a graph showing the relationship between a ratio of a warpage C to a width W (C/W) and a resistance ratio after 1000 cycles, in lithium ion secondary cells of Examples.

DESCRIPTION OF EMBODIMENTS

Figure 1:
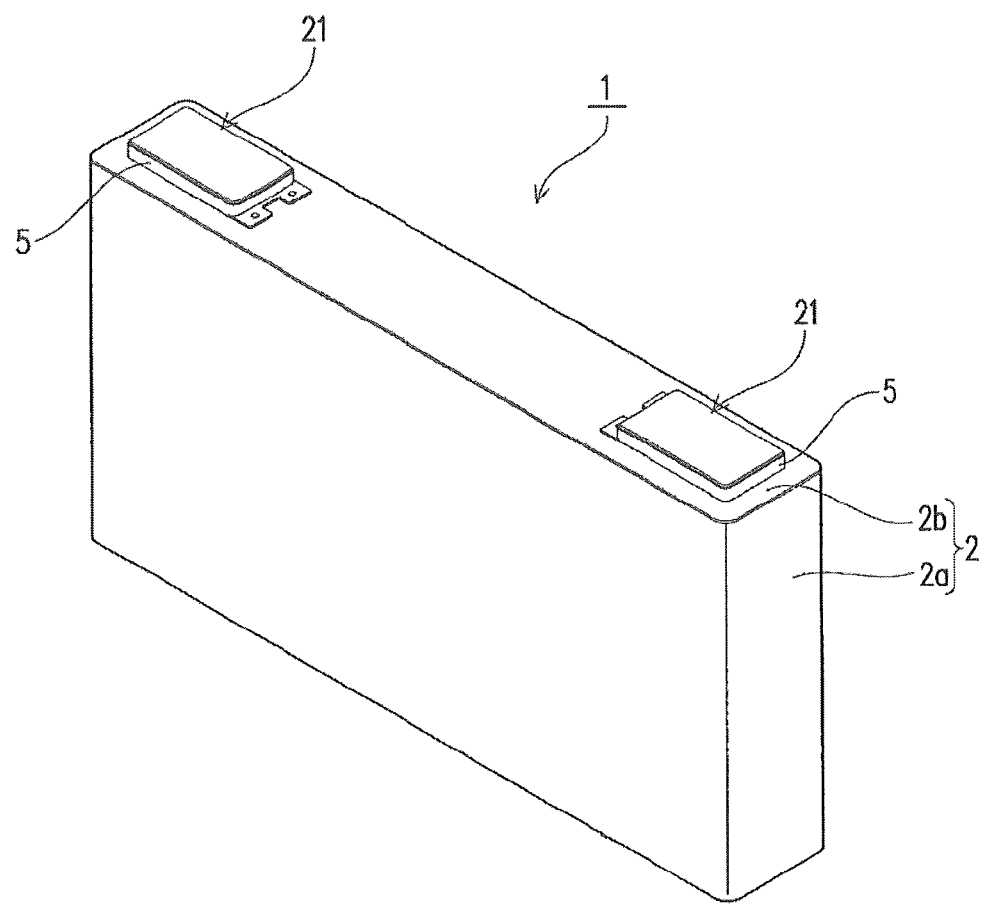
FIG. 1 is a perspective view schematically showing a non-aqueous electrolyte secondary cell as an example of an electric storage device according to Embodiment 1 of the present invention.

An electric storage device according to one embodiment of the present invention includes: a housing; an electrode assembly in roll form housed in the housing, the electrode assembly being formed by winding a positive electrode, a negative electrode, and a separator disposed between the positive electrode and the negative electrode so as to have curved portions and linear portions continuous with the curved portions; current collectors housed in the housing, the current collectors being connected respectively to the positive electrode at one end in a direction of a winding axis of the electrode assembly and to the negative electrode at the other end in the direction of the winding axis of the electrode assembly; and an electrolyte solution housed in the housing, wherein the positive electrode includes a positive electrode substrate and a positive electrode mixture layer formed on the positive electrode substrate in a region excluding one end of the positive electrode substrate, the negative electrode includes a negative electrode substrate and a negative electrode mixture layer formed on the negative electrode substrate in a region excluding the other end of the negative electrode substrate, the positive electrode substrate has at its one end an unformed portion in which the positive electrode mixture layer is not formed, the negative electrode substrate has at its other end an unformed portion in which the negative electrode mixture layer is not formed, the current collectors are connected respectively to at least part of the linear portions in the unformed portion of the positive electrode at the one end in the positive electrode and to at least part of the linear portions in the unformed portion of the negative electrode at the other end in the negative electrode, and the one end in the positive electrode has a length greater than a winding length, and/or the other end in the negative electrode has a length greater than the winding length.

According to the electric storage device of this embodiment, the one end at which the unformed portion is located in the positive electrode has a length greater than the winding length, and the linear portions in the unformed portion in the positive electrode are connected to the corresponding current collector. Therefore, waves (including creases, wrinkles, or the like) occur in the curved portions in the unformed portion of the electrode assembly.

Likewise, the other end at which the unformed portion is located in the negative electrode has a length greater than the winding length, and the linear portions in the unformed portion in the negative electrode are connected to the corresponding current collector. Therefore, waves occur in the curved portions in the unformed portion of the electrode assembly.

In this way, the gaps between the positive electrode and the separator and/or the gaps between the negative electrode and the separator are increased by allowing waves to occur in the curved portions of the positive electrode and/or the negative electrode, thereby enhancing penetration of the electrolyte solution through these gaps. Therefore, even in the case where a portion of the electrode assembly which serves to absorb the electrolyte solution deforms, for example, when the electrode assembly is inserted into the housing, or when an impact is applied to the electric storage device, channels for supplying the electrolyte solution can be easily secured. Accordingly, the supply shortages of the electrolyte solution to the electrode assembly can be suppressed, and therefore the resistance increases in the electrode assembly can be suppressed.

In this way, the electric storage device of this embodiment suppresses the resistance increases.

According to one aspect of the above-mentioned electric storage device, the one end is arcuate so as to be concave toward the other end in the positive electrode, and/or the other end is arcuate so as to be concave toward the one end in the negative electrode.

This makes it possible to easily obtain an electric storage device having curved portions formed with waves.

According to another aspect of the above-mentioned electric storage device, the ratio in the positive electrode substrate and/or the negative electrode substrate of the warpage, as measured per meter in the direction orthogonal to the winding axis, with respect to the width in the direction of the winding axis is at least 0.03 but not more than 0.10.

When the ratio is at least 0.03, the gaps between the positive electrode and the separator and/or the gaps between the negative electrode and the separator are more increased, thereby further making it easy to supply the electrolyte solution. Therefore, the resistance increases due to the supply shortages of the electrolyte solution can be further suppressed. When the ratio is not more than 0.10, the gaps between the positive electrode and the separator and/or the gaps between the negative electrode and the separator are not excessively increased. Therefore, the resistance increases due to excessively increased gaps can be suppressed.

Hereinafter, embodiments of the present invention are described with reference to the drawings. It should be noted that the same or corresponding portions are denoted by the same reference numerals in the following drawings, and the description thereof is not repeated.

Embodiment 1

With reference to FIG. 1 to FIG. 11, a non-aqueous electrolyte secondary cell 1 is described as an example of an electric storage device according to one embodiment of the present invention. The non-aqueous electrolyte secondary cell 1 of this embodiment includes an electrode assembly of a wound type.

Figure 2:
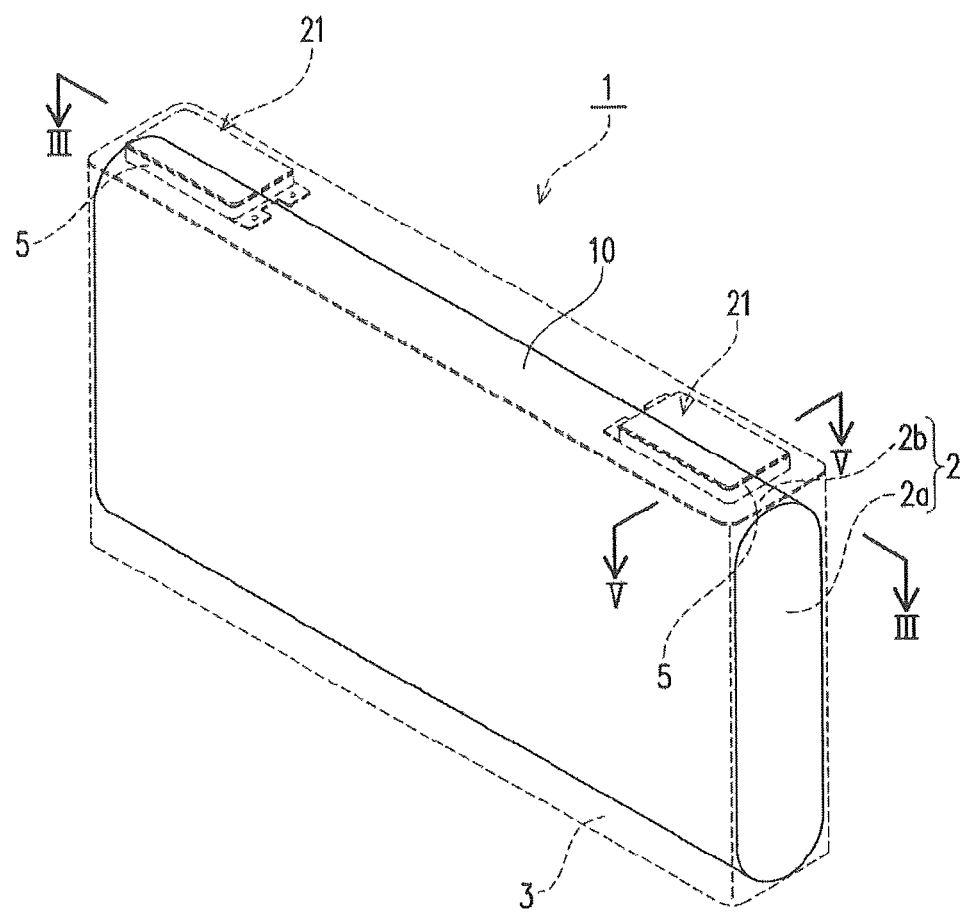
FIG. 2 is a perspective view schematically showing the inside of a housing of the non-aqueous electrolyte secondary cell according to Embodiment 1 of the present invention.
Figure 3:
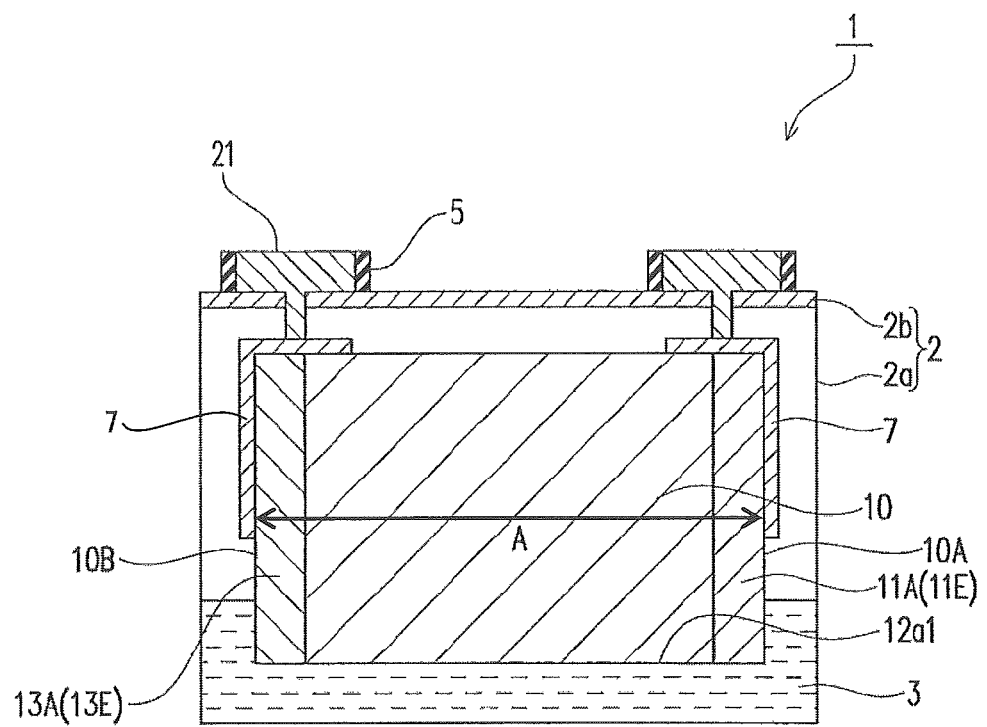
FIG. 3 is a sectional view, taken along the line of FIG. 2, schematically showing the non-aqueous electrolyte secondary cell according to Embodiment 1 of the present invention.

As shown in FIG. 1 to FIG. 3, the non-aqueous electrolyte secondary cell 1 of this embodiment includes a housing 2, an electrolyte solution 3 housed in the housing 2, two outer gaskets 5 attached to the housing 2, an electrode assembly 10 housed in the housing 2, two current collectors 7 electrically connected to the electrode assembly 10, and two external terminals 21 electrically connected respectively to the current collectors 7.

As shown in FIG. 1, the housing 2 has a box-shaped body (case) 2a having an opening and housing the electrode assembly 10, and a rectangular plate cover 2b covering the opening of the body 2a. The body 2a and the cover 2b, for example, are formed of stainless steel plates, and are welded to each other.

The outer gaskets 5 are disposed on the outer surface of the cover 2b. The cover 2b has openings formed respectively on both sides in the longitudinal direction. Each of the outer gaskets 5 has an opening. One of the openings of the cover 2b and the opening of the corresponding outer gasket 5 are continuous to each other. Likewise, the other of the openings of the cover 2b and the opening of the corresponding outer gasket 5 are continuous to each other. The outer gaskets 5, for example, each have a recess, and the corresponding external terminal 21 is disposed in the recess.

The external terminals 21 are connected respectively to the current collectors 7 connected to the electrode assembly 10 (see FIG. 3), so as to be electrically connected to the electrode assembly 10. The external terminals 21, for example, are each formed of an aluminum-containing metal material such as aluminum and aluminum alloy. The current collectors 7 are described later.

The outer gasket 5, the current collector 7, and the external terminal 21 are provided for each of the positive electrode and the negative electrode.

The outer gasket 5, the current collector 7, and the external terminal 21 for the positive electrode are arranged on one end 10A side in a direction of a winding axis A of the electrode assembly 10 (right in FIG. 3), that is, one end side in the longitudinal direction of the cover 2b.

The outer gasket 5, the current collector 7, and the external terminal 21 for the negative electrode are arranged on the other end 10B side in the direction of the winding axis A of the electrode assembly 10 (left in FIG. 3), that is, the other end side in the longitudinal direction of the cover 2b.

As shown in FIG. 2 and FIG. 3, the electrolyte solution 3 is housed within the body 2a. The electrode assembly 10 is immersed in the electrolyte solution 3.

As shown in FIG. 3, in the non-aqueous electrolyte secondary cell 1 in a mounted state, part of the electrolyte solution 3 is retained in a lower part of the housing 2 as excess electrolyte solution, and part of a separator 12 of the electrode assembly 10 is in contact with the excess electrolyte solution (electrolyte solution 3). That is, the electrolyte solution 3 as excess electrolyte solution is housed in at least part of the region, excluding the region occupied by the electrode assembly 10, of an internal space of the housing 2, and is in contact with at least part of the separator 12.

The electrolyte solution 3 is prepared by dissolving an electrolyte in an organic solvent.

Examples of the organic solvent include ester solvents, such as propylene carbonate (PC), ethylene carbonate (EC), dimethyl carbonate (DMC), and ethyl methyl carbonate (EMC), and organic solvents obtained by adding an ether solvent, such as γ-butyrolactone (γ-BL) and diethoxyethane (DEE) to an ester solvent.

Examples of the electrolyte include lithium salts such as lithium perchlorate ($LiClO_4$), lithium borofluoride ($LiBF_4$), and lithium hexafluorophosphate ($LiPF_6$).

As shown in FIG. 2 and FIG. 3, the electrode assembly 10 is housed within the body 2a. In the housing 2, one electrode assembly may be housed, or a plurality of electrode assemblies may be housed. In the latter case, the plurality of the electrode assemblies 10 are electrically connected in parallel to one another.

Figure 4:
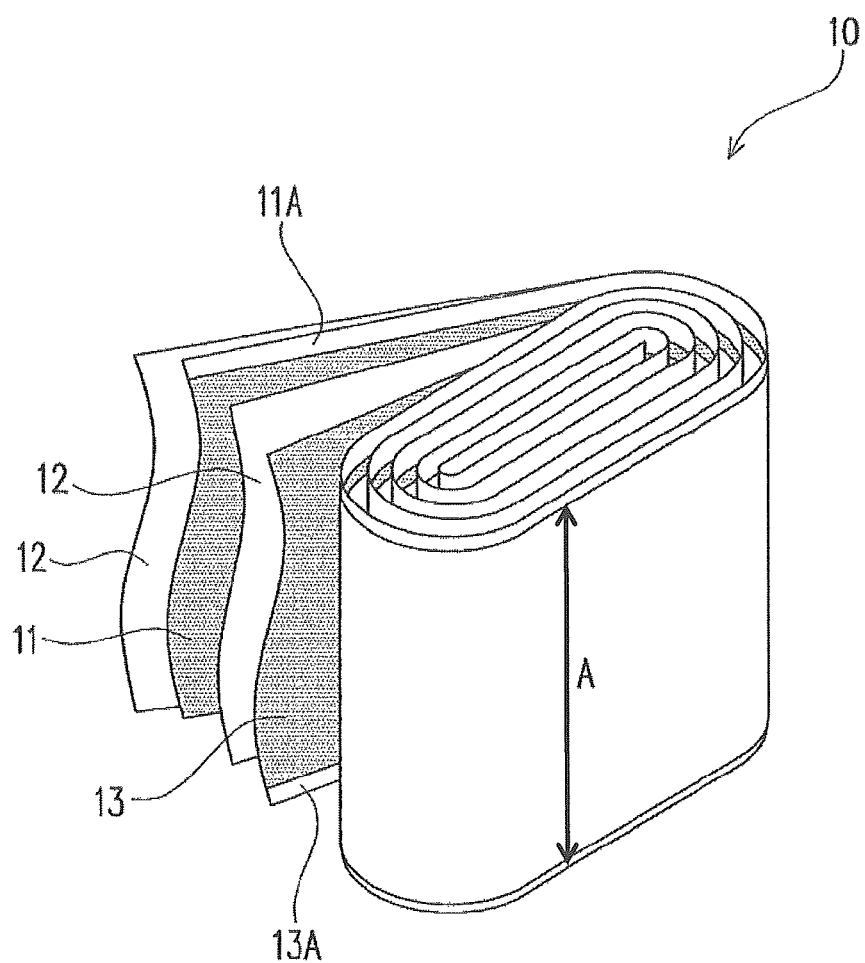
FIG. 4 is a schematic diagram schematically showing an electrode assembly constituting the non-aqueous electrolyte secondary cell according to Embodiment 1 of the present invention.
Figure 5:
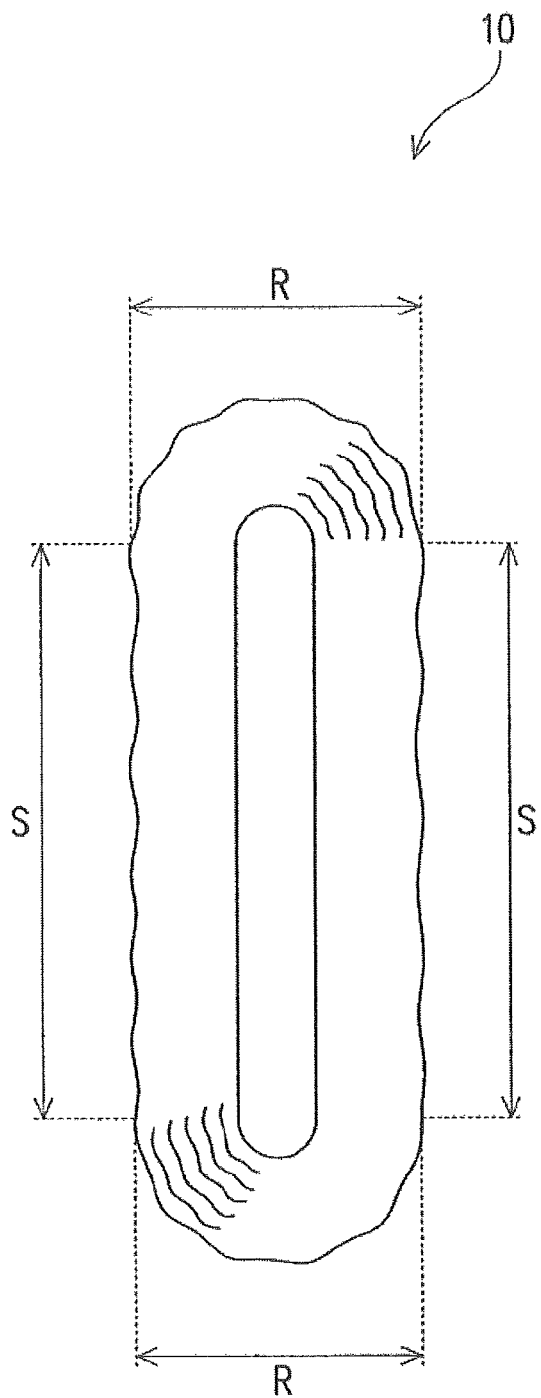
FIG. 5 is a sectional view, taken along the line V-V of FIG. 2, as a schematic diagram of the electrode assembly according to Embodiment 1 of the present invention.

The electrode assembly 10 is in the form of a roll (in a laterally elongated (flattened) cylindrical shape in this embodiment), as shown in FIG. 4, and has curved portions R and linear portions S continuous with the curved portions R, as shown in FIG. 5.

The curved portions R are each substantially arcuate. In this embodiment, the curved portions R are located in the upper and lower parts of FIG. 5.

The linear portions S are each flat. In this embodiment, the linear portions S are located in the left and right parts of FIG. 5. Each of the linear portions S is substantially straight, which includes the cases where small waves occur therein. As described later, the linear portions S located at the one end 10A or the other end 10B in the direction of the winding axis A (imaginary straight line) of the electrode assembly 10 are bound at least partially by the corresponding current collector 7. Accordingly, the linear portions S may be inclined in some cases in a region in which the linear portions S are bound by the current collector 7 (connection region with the current collector 7) from the linear portions S before being bound.

As shown in FIG. 4, the electrode assembly 10 includes a positive electrode 11, the separator 12, and a negative electrode 13. The electrode assembly 10 is formed into a roll by being wound in the state where the separator 12 is disposed on the negative electrode 13, the positive electrode 11 is disposed on the separator 12, and the separator 12 is disposed on the positive electrode 11. That is, in the electrode assembly 10, the separator 12 in the form of a strip is formed on the outer peripheral side of the negative electrode 13 in the form of a strip, the positive electrode 11 in the form of a strip is formed on the outer peripheral side of the separator 12, and the separator 12 in the form of a strip is formed on the outer peripheral side of the positive electrode 11.

It should be noted that the winding axis A extends along the width direction of the positive electrode 11 and the negative electrode 13, as shown in FIG. 4. In the electrode assembly 10 of this embodiment, the separator having insulating properties is disposed between the positive electrode 11 and the negative electrode 13, and therefore the positive electrode 11 and the negative electrode 13 are not electrically connected to each other.

Figure 6:
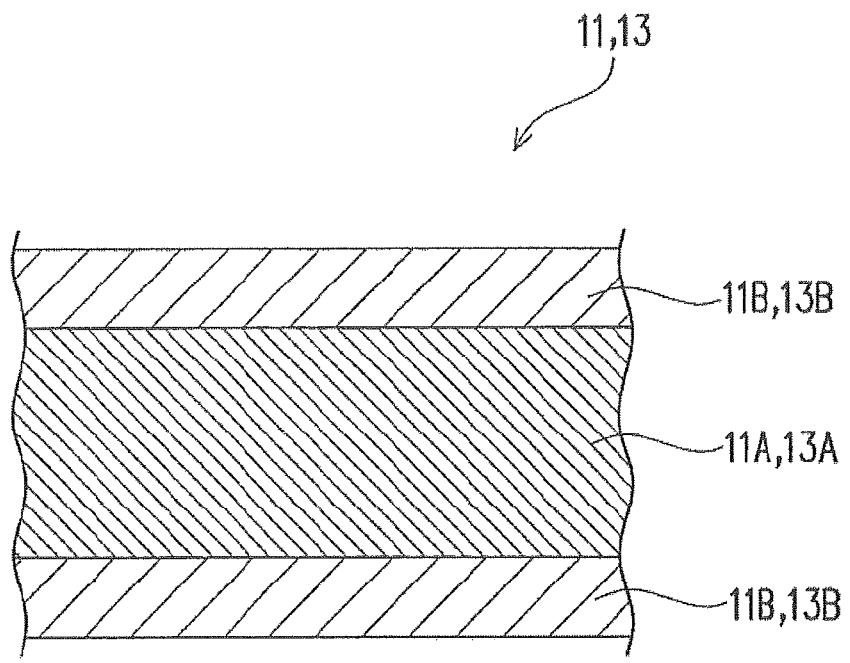
FIG. 6 is an enlarged schematic diagram schematically showing a positive electrode and a negative electrode constituting the electrode assembly according to Embodiment 1 of the present invention.
Figure 7:
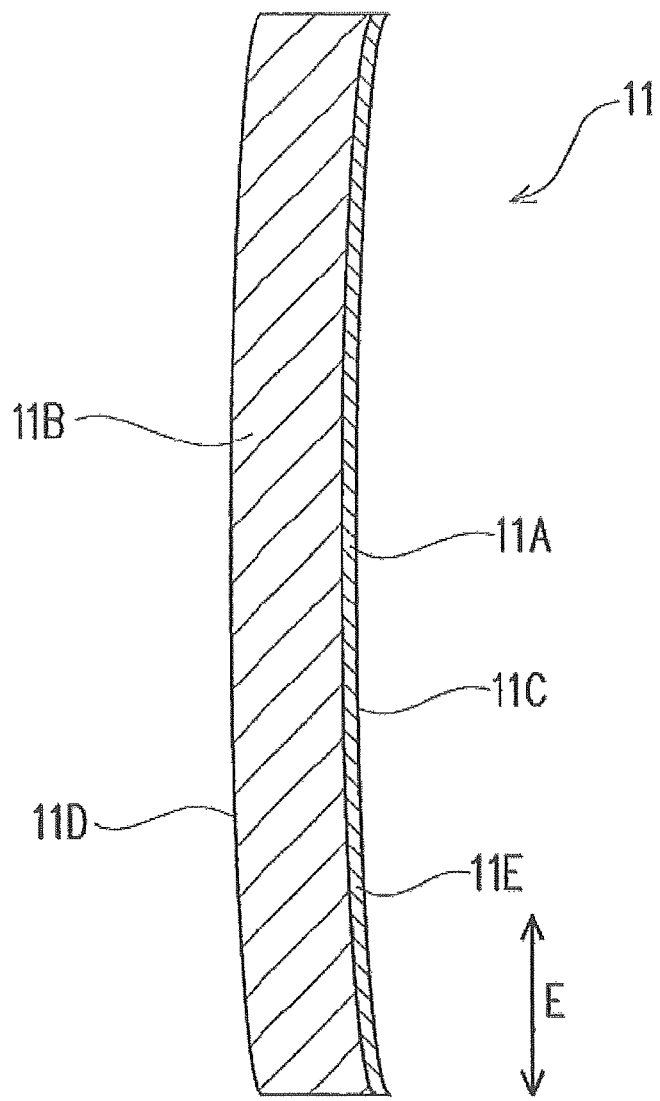
FIG. 7 is a plan view schematically showing the positive electrode before being wound according to Embodiment 1 of the present invention.

As shown in FIG. 3, FIG. 6, and FIG. 7, the positive electrode 11 in the form of a strip constituting the electrode assembly 10 has a positive electrode current collector foil 11A in the form of a strip as a positive electrode substrate, and a positive electrode mixture layer 11B formed on the positive electrode current collector foil 11A in a region excluding one end 11C (the one end 11C of the positive electrode current collector foil 11A located on one side in the direction of the winding axis A).

In other words, as shown in FIG. 6 and FIG. 7, the positive electrode 11 includes the positive electrode current collector foil 11A disposed along the one end 11C extending in the winding direction E, and the positive electrode mixture layer 11B disposed along the other end 11D extending in the winding direction E on the opposite side of the one end 11C, as viewed from the positive electrode mixture layer 11B side.

Further in other words, the positive electrode current collector foil 11A constituting the positive electrode 11 has, at the one end 11C of the positive electrode current collector foil 11A, an unformed portion 11E in which the positive electrode mixture layer 11B is not formed (the positive electrode mixture layer 11B is not formed on the positive electrode current collector foil 11A).

Figure 8:
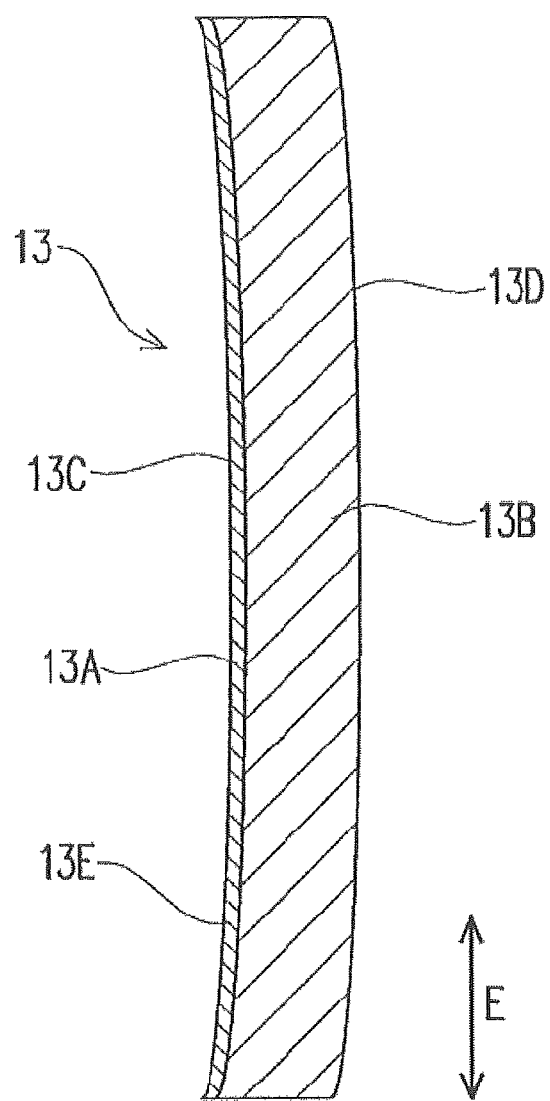
FIG. 8 is a plan view schematically showing the negative electrode before being wound according to Embodiment 1 of the present invention.

As shown in FIG. 3, FIG. 6, and FIG. 8, the negative electrode 13 in the form of a strip constituting the electrode assembly 10 has a negative electrode current collector foil 13A in the form of a strip as a negative electrode substrate, and a negative electrode mixture layer 13B formed on the negative electrode current collector foil 13A in a region excluding the other end 13C (the other end 13C of the negative electrode current collector foil 13A located on the other side in the direction of the winding axis A).

In other words, as shown in FIG. 6 and FIG. 8, the negative electrode 13 includes the negative electrode current collector foil 13A disposed extending along the other end 13C, and the negative electrode mixture layer 13B disposed extending along one end 13D on the opposite side of the other end 13C, as viewed from the negative electrode mixture layer 13B side.

Further in other words, the negative electrode current collector foil 13A constituting the negative electrode 13 has, at the other end 13C of the negative electrode current collector foil 13A, an unformed portion 13E in which the negative electrode mixture layer 13B is not formed (the negative electrode mixture layer 13B is not formed on the negative electrode current collector foil 13A).

As shown in FIG. 3, the unformed portion 11E of the positive electrode 11 is disposed at the one end 10A in the direction of the winding axis A (on one side in the direction of the winding axis A), and the unformed portion 13E of the negative electrode 13 is disposed at the other end 10B in the direction of the winding axis A (on the other side in the direction of the winding axis A). That is, the unformed portion 11E of the positive electrode 11 and the unformed portion 13E of the negative electrode 13 are positioned symmetrically to each other with respect to an imaginary line extending in the winding direction and located at the center of the width of the electrode assembly 10.

The one end 10A in the positive electrode 11 has a length greater than the winding length (length in the longitudinal direction E of the positive electrode 11). In other words, the one end 11C (end edge) on the side of which the unformed portion 11E is formed in the positive electrode current collector foil 11A has a length greater than the winding length (length in the winding direction E of the positive electrode current collector foil 11A). In still other words, the end edge 11C in the unformed portion 11E of the positive electrode 11 has a length greater than the winding length. That is, the length to which the end edge on one side (one end edge of the unformed portion of the positive electrode substrate) in the width direction of the positive electrode 11 in the form of a strip extends in the longitudinal direction is greater than the winding length.

The other end 10B in the negative electrode 13 has a length greater than the winding length (length in the longitudinal direction E of the negative electrode 13). In other words, the other end 13C (end edge) on the side of which the unformed portion 13E is formed in the negative electrode current collector foil 13A has a length greater than the winding length (length in the winding direction E of the negative electrode current collector foil 13A). In still other words, the end edge 13C in the unformed portion 13E of the negative electrode 13 has a length greater than the winding length. That is, the length to which the end edge (the other end edge of the unformed portion of the negative electrode substrate) on the other side in the width direction of the negative electrode 13 in the form of a strip extends in the longitudinal direction is greater than the winding length.

In this embodiment, the one end 11C in the unformed portion 11E of the positive electrode current collector foil 11A is arcuate so as to be concave toward the other end 11D on the opposite side of the unformed portion 11E while extending in the longitudinal direction E. The other end 13C in the unformed portion 13E of the negative electrode current collector foil 13A is arcuate so as to be concave toward the one end 13D on the opposite side of the unformed portion 13E while extending in the longitudinal direction. In other words, the end edges in the unformed portions 11E and 13E of the positive electrode current collector foil 11A and the negative electrode current collector foil 13A are arcuate so as to be concave respectively toward the end edges on the opposite sides of the unformed portions 11E and 13E.

Here, the term "length of an end" means the length of the positive electrode 11 and/or the negative electrode 13, as measured per meter in the winding direction E, along one end and/or the other end extending between both ends in the winding direction and is not the shortest distance between both ends. That is, the "length of an end" is the length, as measured per meter in the longitudinal direction, along the end edge on one side and/or the other side in the width direction of the positive electrode 11 and/or the negative electrode 13 in the form of a strip. In this embodiment, the "length of an end" means a length along a curve (arcuate curve).

Figure 9A:
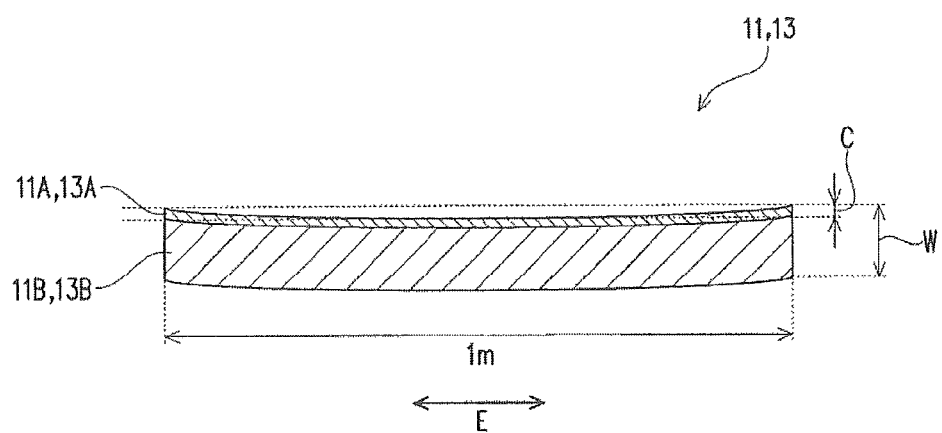
FIG. 9A is a side view schematically showing the positive electrode and the negative electrode before being wound according to Embodiment 1 of the present invention.
Figure 9B:
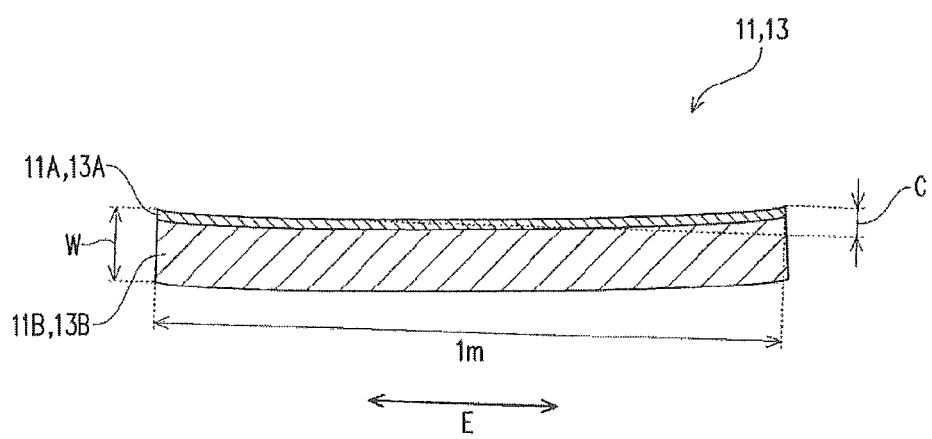
FIG. 9B is a side view schematically showing the positive electrode and the negative electrode before being wound according to Embodiment 1 of the present invention.

Further, the term "winding length" is the length in the winding direction E (longitudinal direction E) of the positive electrode 11 and the negative electrode 13. Specifically, in this embodiment, the "winding length" is the distance, as measured per meter in the winding direction E, between one end edge in the winding direction E of the positive electrode 11 and the negative electrode 13, and an imaginary straight line extending from the other end edges in the winding direction E of the unformed portions (11E and 13E) in parallel to the one end edge (for example, as shown in FIGS. 9A and 9B). That is, the shortest distance, as measured per meter in the longitudinal direction, between the parallel lines, extending in the width direction, passing respectively through both ends in the longitudinal direction of the positive electrode 11 and the negative electrode 13 in the form of a strip.

As shown in FIG. 9A, in the positive electrode current collector foil 11A and the negative electrode current collector foil 13A, the ratio of the warpage C, as measured per meter in the direction orthogonal to the winding axis A (the winding direction E), with respect to the length (width W) in the direction of the winding axis A of the electrode assembly 10 is preferably at least 0.03 but not more than 0.10, more preferably at least 0.03 but not more than 0.09, further preferably at least 0.05 but not more than 0.07.

Here, the above-mentioned values are measured under no load after returning each of the positive electrode 11 and the negative electrode 13 into the form of a strip from the state of being wound.

The warpage C (see FIG. 9A and FIG. 11) means the difference, as measured per meter in the winding direction E, between the position at which the positive electrode current collecting substrate and/or the negative electrode current collecting substrate is convex most outwardly and the position at which the positive electrode current collecting substrate and/or the negative electrode current collecting substrate is concave most inwardly in the positive electrode 11 and/or the negative electrode 13. In this embodiment, the warpage C means the difference between the position at which the positive electrode current collector foil 11A and/or the negative electrode current collector foil 13A is most convex and the position at which the positive electrode current collector foil 11A and/or the negative electrode current collector foil 13A is most concave.

The width W means a distance in the direction of the winding axis A (direction orthogonal to the winding direction E), that is, the distance from the one ends 11C and 13D to the respective other ends 11D and 13C. In this embodiment, the width W is the width of each of the positive electrode current collector foil 11A and the negative electrode current collector foil 13A. In the case where the width is not constant, the maximum width is taken as the width W.

It is also possible to measure the warpage C and the width W by unwinding a positive electrode or a negative electrode taken out from a disassembled battery cell and placing a transparent acrylic plate on the positive electrode or negative electrode in the state where the positive electrode or the negative electrode is straightened.

FIG. 9A shows the case where the end edges on both sides in the winding direction E of each of the positive electrode 11 and the negative electrode 13 are parallel to each other, as an example. On the other hand, as shown in FIG. 9B, even in the case where the end edges on both sides in the winding direction E of each of the positive electrode 11 and the negative electrode 13 are not parallel to each other, definitions of the warpage C and the width W are the same as above, and preferable values of the ratio of the warpage C, as measured per meter in the direction orthogonal to the winding axis A, with respect to the width W in the direction of the winding axis A are also the same as above.

This embodiment describes the case where the one end 10A in the positive electrode 11 has a length greater than the winding length, and the other end 10B in the negative electrode 13 has a length greater than the winding length, as an example. One of these configurations may be employed for either the positive electrode 11 or the negative electrode. However, it is preferable that these configurations be employed respectively for the positive electrode 11 and the negative electrode 13.

The relationship between the length of the one end 10A (11C) and the length of the other end 10B (11D) in the positive electrode 11 is not specifically limited. However, there may be a relationship of: length of the other end 10B>length of the one end 10A>winding length, from the viewpoint of production.

The relationship between the length of the one end 10A (13D) and the length of the other end 10B (13C) in the negative electrode 13 is not specifically limited. However, there may be a relationship of: length of the one end 10A>length of the other end 10B>winding length, from the viewpoint of production.

In this embodiment, the positive electrode current collector foil 11A and the negative electrode current collector foil 13A respectively include the positive electrode mixture layer 11B and the negative electrode mixture layer 13B formed on each of both sides thereof. However, the present invention is not specifically limited to such a configuration. For example, the positive electrode mixture layer 11B may be formed on one side of the positive electrode current collector foil 11A, or the negative electrode mixture layer 13B may be formed on one side of the negative electrode current collector foil 13A, in which, however, the positive electrode mixture layer 11B and the negative electrode mixture layer 13B face each other.

Further, the positive electrode current collector foil and the negative electrode current collector foil are mentioned as examples of the positive electrode substrate and the negative electrode substrate in this embodiment. However, the positive electrode substrate and the negative electrode substrate of the present invention are not limited to those in the form of a foil.

The positive electrode mixture layer 11B has a positive electrode active material, a conductive additive, and a binder. The negative electrode mixture layer 13B has a negative electrode active material and a binder. The negative electrode mixture layer 13B may further have a conductive additive.

The positive electrode active material can contribute to electrode reactions such as charge and discharge of the positive electrode. Materials for the positive electrode active material are not specifically limited. Examples thereof include lithium composite oxides such as lithium nickel oxide ($LiNiO_2$), spinel lithium manganese oxide ($LiMn_2O_4$), and lithium cobalt oxide ($LiCoO_2$).

The negative electrode active material can contribute to electrode reactions such as charge and discharge of the negative electrode. Materials for the negative electrode active material are not specifically limited. Examples thereof include carbon materials such as amorphous carbon, non-graphitizable carbon, graphitizable carbon, and graphite.

The binder is not specifically limited, and examples of the binder include polyacrylonitrile, polyvinylidene fluoride (PVDF), a copolymer of vinylidene fluoride and hexafluoropropylene, polytetrafluoroethylene, polyhexafluoropropylene, polyethylene oxide, polypropylene oxide, polyphosphazen, polysiloxane, polyvinyl acetate, polyvinyl alcohol, polymethylmethacrylate, polyacrylic acid, polymethacrylic acid, styrene-butadiene rubber, nitrile-butadiene rubber, polystyrene, and polycarbonate.

The separator 12 is disposed between the positive electrode 11 and the negative electrode 13, and serves to allow the electrolyte solution 3 to permeate therethrough while blocking the electrical connection between the positive electrode 11 and the negative electrode 13.

The separator 12 may be composed of one layer, or may be composed of two or more layers including a separator substrate layer and an inorganic layer formed on one surface of the substrate layer. Further, the separator substrate layer may have both surfaces each coated with the inorganic layer. Further, the separator 12 may have a three-layer structure, for example, of polyethylene/polypropylene/polyethylene. By applying a technique for forming the separator 12 with a multilayer structure, a material obtained by overcoating an electrode plate coated with an active material, or the like, may be employed for the electric storage device.

In the case where the separator 12 is composed of one layer, a microporous polyolefin film, for example, can be used as the separator 12.

In the case where the separator 12 includes a separator substrate layer and an inorganic layer, the separator substrate layer is not specifically limited. As the separator substrate layer, general porous plastic films can be used. Examples thereof include woven fabrics and non-woven fabrics of polymers, natural fibers, hydrocarbon fibers, glass fibers, and ceramic fibers.

The inorganic layer is referred to also as an inorganic coating layer, and contains inorganic particles, a binder, or the like.

The inorganic particles are not specifically limited, and examples thereof include fine particles of oxides such as iron oxide, $SiO_2$, $Al_2O_3$, $TiO_2$, $BaTiO_2$, ZrO, and alumina-silica composite oxide; fine particles of nitrides such as aluminum nitride and silicon nitride; fine particles of poorly soluble ionic crystals such as calcium fluoride, barium fluoride, and barium sulfate; fine particles of covalent crystals such as silicon and diamond; fine particles of clays such as talc and montmorillonite; and particles of mineral resource-derived materials such as boehmite, zeolite, apatite, kaolin, mullite, spinel, olivine, sericite, bentonite, and mica, or particles of artificial materials thereof.

The binder is the same as the binder contained in the positive electrode and the negative electrode, and thus the description of the binder is not repeated herein.

It should be noted that the separator substrate layer and the inorganic layer may single-layered, or may be multi-layered.

The current collectors 7 shown in FIG. 3 are respectively connected to the one end 10A (on the right side in FIG. 3) and the other end 10B (on the left side in FIG. 3) in the direction of the winding axis A of the above-mentioned electrode assembly 10.

Specifically, the current collector 7 on the positive electrode 11 side (the current collector 7 on the right side in FIG. 3) is connected to at least part of the linear portions S (see FIG. 5) in the unformed portion 11E in which the positive electrode mixture layer 11B is not formed at the one end 11C of the positive electrode current collector foil 11A.

The current collector 7 on the negative electrode 13 side (the current collector 7 on the left side in FIG. 3) is connected to at least part of the linear portion S (see FIG. 5) in the unformed portion 13E in which the negative electrode mixture layer 13B is not formed at the other end 13C of the negative electrode current collector foil 13A.

The current collectors 7 may be connected to the positive electrode current collector foil 11A and the negative electrode current collector foil 13A in a layered state in part of the linear portions S or in the entirety thereof, or may be further connected thereto also in the curved portions R on one of the opposite sides (on the upper side in FIG. 3). The current collectors 7 are preferably connected to the positive electrode current collector foil 11A and the negative electrode current collector foil 13A in a layered state at the center of the linear portions S. However, the current collectors 7 are not connected to the curved portions R at least on one of the opposite sides.

It should be noted that, although the shape of the current collectors 7 is not specifically limited, the current collectors 7 each have a shape that allows current to be collected from the positive electrode current collector foil 11A and the negative electrode current collector foil 13A in a layered state through the linear portions S, and have a plate shape, for example.

Subsequently, a method for producing an electric storage device (the non-aqueous electrolyte secondary cell 1) according to this embodiment is described.

A method for producing an electric storage device (the non-aqueous electrolyte secondary cell 1) of this embodiment includes: a step of preparing a positive electrode including a positive electrode substrate and a positive electrode mixture layer formed on the positive electrode substrate in a region excluding one end edge in a winding direction of the positive electrode substrate; a step of preparing a negative electrode including a negative electrode substrate and a negative electrode mixture layer formed on the negative electrode substrate in a region excluding the other end edge in the winding direction of the negative electrode substrate; a step of forming an electrode assembly in roll form having curved portions and linear portions continuous with the curved portions by winding the positive electrode and the negative electrode with an separator interposed therebetween; a step of forming current collectors so as to be connected respectively to the positive electrode at one end in a direction of a winding axis of the electrode assembly and to the negative electrode at the other end in the direction of the winding axis of the electrode assembly; and a step of housing the electrode assembly, the current collectors, and the electrolyte solution into the housing. In the above-mentioned step of forming the electrode assembly, the winding is performed so that an unformed portion in which the positive electrode mixture layer is not formed at the one end edge of the positive electrode substrate is located at the one end, and an unformed portion in which the negative electrode mixture layer is not formed at the other end edge of the negative electrode substrate is located at the other end. In the above-mentioned step of forming the current collectors, the current collectors are formed so as to be connected respectively to at least part of the linear portions in the unformed portion at the one end of the positive electrode substrate and to at least part of the linear portions in the unformed portion at the other end of the negative electrode substrate. In the above-mentioned step of preparing the positive electrode, the positive electrode in which the one end edge has a length greater than the winding length is prepared, and/or in the above-mentioned step of preparing the negative electrode, the negative electrode in which the other end edge has a length greater than the winding length is prepared.

According to the method for producing the electric storage device of this embodiment, the positive electrode in which the one end edge at which the unformed portion is located has a length greater than the winding length is prepared, and the linear portions in the unformed portion in the positive electrode are connected to the corresponding current collector. Therefore, waves (including creases, wrinkles, or the like) occur in the curved portions in the unformed portion of the electrode assembly.

Likewise, the negative electrode in which the other end edge at which the unformed portion is located has a length greater than the winding length is prepared, and the linear portions in the unformed portion in the negative electrode are connected to the corresponding current collector. Therefore, waves occur in the curved portions in the unformed portion of the electrode assembly.

In this way, the occurrence of waves in the curved portions of the positive electrode and/or the negative electrode increases the gaps between the positive electrode and the separator and/or the gaps between the negative electrode and the separator, thereby enhancing the penetration of the electrolyte solution through the gaps. Therefore, even in the case where a portion of the electrode assembly which serves to absorb the electrolyte solution deforms, for example, when the electrode assembly is inserted into the housing, or when an impact is applied to the electric storage device, channels for supplying the electrolyte solution can be easily secured. Accordingly, the supply shortages of the electrolyte solution to the electrode assembly can be suppressed, and therefore the resistance increases in the electrode assembly can be suppressed.

According to one aspect of the above-mentioned method for producing the electric storage device, in the step of preparing the above-mentioned positive electrode, the positive electrode substrate in which the one end edge in the unformed portion is arcuate so as to be concave toward the other end edge on the opposite side of the unformed portion is used, and/or in the step of preparing the negative electrode, the negative electrode substrate in which the other end edge in the unformed portion is arcuate so as to be concave toward the one end edge on the opposite side of the unformed portion is used.

This makes it possible to easily obtain an electric storage device allowed to have waves occurring in the curved portions.

According to another aspect of the method for producing the above-mentioned electric storage device, in the step of preparing the positive electrode and/or the step of preparing the negative electrode, the ratio in the positive electrode substrate and/or the negative electrode substrate of the warpage, as measured per meter in the direction orthogonal to the winding axis, with respect to the width in the direction of the winding axis is at least 0.03 but not more than 0.10.

When the ratio is at least 0.03, the gaps between the positive electrode and the separator and/or the gaps between the negative electrode and the separator are more increased, thereby further facilitating the supply of the electrolyte solution. Therefore, the resistance increases due to the supply shortages of the electrolyte solution can be further suppressed. When the ratio is not more than 0.10, the gaps between the positive electrode and the separator and/or the gaps between the negative electrode and the separator are not excessively increased. Therefore, the resistance increases due to excessively increased gaps can be suppressed.

First, a step of preparing the positive electrode 11 is described.

As shown in FIG. 7, the positive electrode 11 including the positive electrode current collector foil 11A as a positive electrode substrate and the positive electrode mixture layer 11B formed on the positive electrode current collector foil 11A in a region excluding one end edge (the one end 11C) is prepared. In this step, the positive electrode 11 in which the one end edge (the one end 11C) extending in the winding direction E has a length greater than the winding length is prepared. In this step, it is preferable to use the positive electrode current collector foil 11A in which the one end edge (the one end 11C) in the unformed portion 11E (uncoated portion in which the positive electrode mixture layer 11B is not formed) is arcuate so as to be concave toward the other end edge (the other end 11D) on the opposite side of the unformed portion 11E. In this embodiment, the positive electrode 11 in which the arc of the one end 11C has a length greater than the winding length is prepared.

Figure 10:
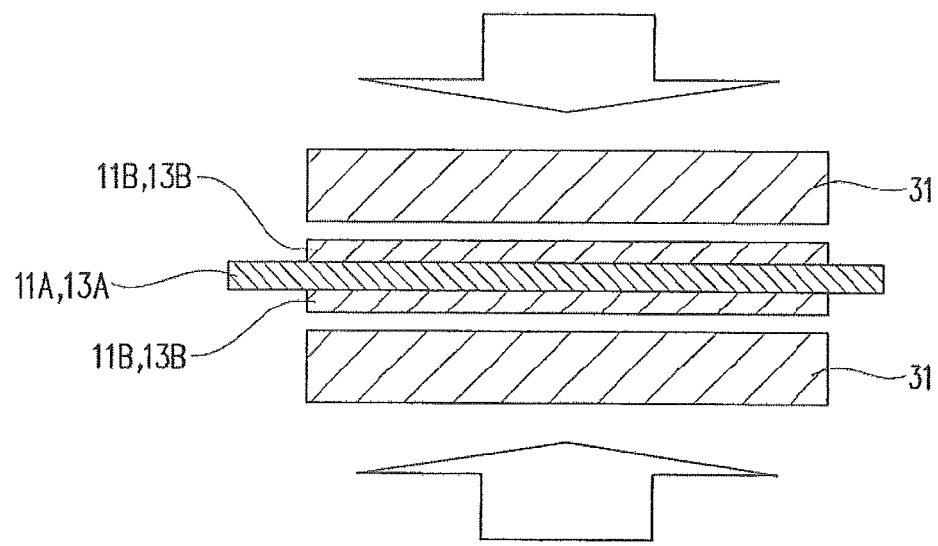
FIG. 10 is a schematic diagram for explanation of a method for producing the positive electrode and the negative electrode according to Embodiment 1 of the present invention.
Figure 11:
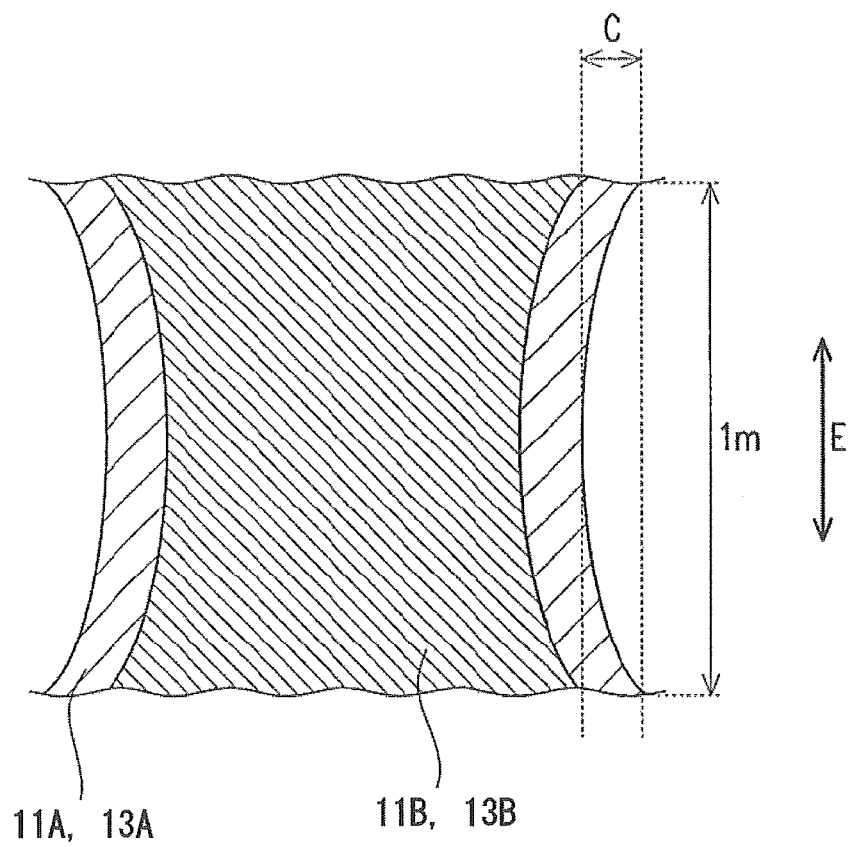
FIG. 11 is a schematic diagram for explanation of a method for producing the positive electrode and the negative electrode according to Embodiment 1 of the present invention.

Specifically, a positive electrode active material, a conductive additive, and a binder are mixed, and this mixture is added to a solvent, which is kneaded. Thus, a positive electrode mixture is prepared. This positive electrode mixture is applied to at least one surface of the positive electrode current collector foil 11A in a region excluding the one end 11C. After drying, compression molding is conducted using a roll press 31, as shown in FIG. 10. At this time, to an object in the state shown in FIG. 11, a higher pressure is applied in the center portion in the winding direction E than in the peripheral portion. It is preferable that only the positive electrode mixture be compressed by a pressure. In this way, a curve can be formed as shown in FIG. 7 by applying a nonuniform stress to the positive electrode mixture layer 11B. The object shown in FIG. 11 is cut into two along the winding direction E, followed by vacuum drying. Thus, the positive electrode 11 shown in FIG. 7 is prepared.

Next, a step of preparing the negative electrode 13 is described.

As shown in FIG. 8, the negative electrode 13 including the negative electrode current collector foil 13A as a negative electrode substrate and the negative electrode mixture layer 13B formed on the negative electrode current collector foil 13A in a region excluding the other end edge (the other end 13C) is prepared. In this step, the negative electrode 13 in which the other end edge (the other end 13C) extending in the winding direction E has a length greater than the winding length is prepared. In this step, it is preferable to use the negative electrode current collector foil 13A in which the other end edge (the other end 13C) of the unformed portion 13E (uncoated portion in which the negative electrode mixture layer 13B is not formed) is arcuate so as to be concave toward the one end edge (the one end 13D) on the opposite side of the unformed portion 13E. In this embodiment, the negative electrode 13 in which the arc of the other end 13C has a length greater than the winding length is formed.

Specifically, a negative electrode active material and a binder are mixed, and this mixture is added to a solvent, which is kneaded. Thus, a negative electrode mixture is prepared. This negative electrode mixture is applied to at least one surface of the negative electrode current collector foil 13A in a region excluding the one end 13D. After drying, compression molding is conducted using the roll press 31, as shown in FIG. 10. At this time, to an object in the state shown in FIG. 11, a higher pressure is applied in the center portion in the winding direction E than in the peripheral portion. It is preferable that only the negative electrode mixture be compressed by a pressure. In this way, a curve can be formed as shown in FIG. 8 by applying a nonuniform stress to the negative electrode mixture layer 13B. The object shown in FIG. 11 is cut into two along the winding direction E, followed by vacuum drying. Thus, the negative electrode 13 shown in FIG. 8 is prepared.

In the step of preparing the positive electrode 11 so that the one end edge has a length greater than the winding length, and/or the step of preparing the negative electrode 13a so that the other end edge has a length greater than the winding length, it is also possible to prepare such a positive electrode and/or such a negative electrode, for example, by altering the kinds, the porosities, or the like, of the active materials, other than by applying a nonuniform stress to the positive electrode mixture layer 11B and/or the negative electrode mixture layer 13B.

In the step of preparing the above-mentioned the positive electrode 11 and the step of preparing the negative electrode 13, the ratio (C/W) in the positive electrode current collector foil 11A and the negative electrode current collector foil 13A of the warpage C, as measured per meter in the winding direction E (orthogonal to the winding axis A), with respect to the width W in the direction of the winding axis A is preferably at least 0.03 but not more than 0.10, more preferably at least 0.03 but not more than 0.09, further preferably at least 0.05 but not more than 0.07. Such a ratio (C/W) can be achieved by the above-mentioned method.

Subsequently, a step of forming an electrode assembly is described.

The electrode assembly 10 in roll form having the curved portions R and the linear portions S continuous with the curved portions R is formed by winding the positive electrode 11 and the negative electrode 13 via the separator 12. In this step, the winding is performed so that the unformed portion 11E, at the one end edge (the one end 11C) of the positive electrode current collector foil 11A, in which the positive electrode mixture layer 11B is not formed is located at the one end 10A in the direction of the winding axis A, and the unformed portion 13E, at the other end edge (the other end 13C) of the negative electrode current collector foil 13A, in which the negative electrode mixture layer 13B is not formed is located at the other end 10B in the direction of the winding axis A.

Depending on the conditions, a stack of the positive electrode 11, the separator 12, and the negative electrode 13 is wound while being drawn (while being plastically deformed) in this step.

Such winding allows waves (wrinkles or creases) to occur in a portion having excess length, as compared to the length in the winding direction E (the winding length), (the portion making a difference between the length of the one end 10A of the positive electrode 11 and the winding length or the portion making a difference between the length of the other end 10B of the negative electrode 13 and the winding length), as a result of which, gaps are formed between the positive electrode 11 and the separator 12 and between the negative electrode 13 and the separator 12.

Further, a step of forming current collectors is described.

The current collectors 7 are formed so as to be connected respectively to the positive electrode 11 at the one end 10A in the direction of the winding axis A of the electrode assembly 10 and to the negative electrode 13 at the other end 10B in the direction of the winding axis A of the electrode assembly 10. In this step, one of the current collectors 7 is formed so as to be connected to at least part of the linear portions S in the unformed portion 11E of the positive electrode 11 at the one end 10A in the direction of the winding axis A, and the other of the current collectors 7 is formed so as to be connected to at least part of the linear portions S in the unformed portion 13E of the negative electrode 13 at the other end 10B in the direction of the winding axis A. By performing this step, the unformed portions 11E and 13E are respectively bound in regions of the electrode assembly 10 where the current collectors 7 are formed, thereby generating waves in the curved portions R excluding the regions connected to the current collectors 7.

In this step, the current collectors 7 may be welded to the electrodes (the positive electrode 11, the negative electrode 13), with the electrode assembly 10 wound tightly, so as to prevent loosening of the connection of the current collectors 7 to the electrodes.

Finally, a step of housing the electrode assembly, the current collectors, and an electrolyte solution into the housing is described.

That is, the electrode assembly 10 and the current collectors 7 each connected to the electrode assembly 10 are arranged within the body 2a of the housing 2. In the case of a plurality of electrode assemblies 10, the current collectors of the electrode assemblies 10, for example, electrically connected in parallel to one another are arranged within the body 2a. Subsequently, the current collectors 7 are welded respectively to the external terminals 21 in the outer gaskets 5 on the cover 2b, and the cover 2b is attached to the body 2a.

Next, an electrolyte solution is poured into the body 2a of the housing 2. The electrolyte solution is not specifically limited. However, the electrolyte solution may be prepared, for example, by adding $LiPF_6$ to a mixed solvent of propylene carbonate (PC):dimethyl carbonate (DMC):ethyl methyl carbonate (EMC)=3:2:5 (volume ratio). Further, a known additive may be further added thereto. By performing the above-described steps, the non-aqueous electrolyte secondary cell 1 of this embodiment shown in FIG. 1 to FIG. 3 is produced.

As has been described above, the non-aqueous electrolyte secondary cell 1 as an example of the electric storage device according to this embodiment includes the housing 2, and the electrode assembly 10 in roll form housed in the housing 2 and formed by winding the positive electrode 11, the negative electrode 13, and the separator 12 disposed between the positive electrode 11 and the negative electrode 13 so as to have the curved portions R and the linear portions S continuous with the curved portions R.

Further, the non-aqueous electrolyte secondary cell 1 includes the current collectors 7 housed in the housing 2 and connected respectively to the positive electrode 11 at the one end 10A in the direction of the winding axis A of the electrode assembly 10 and to the negative electrode 13 at the other end 10B in the direction of the winding axis A of the electrode assembly 10.

Further, the non-aqueous electrolyte secondary cell 1 includes the electrolyte solution 3 housed in the housing 2.

The positive electrode 11 includes a positive electrode substrate (in this embodiment, the positive electrode current collector foil 11A) and the positive electrode mixture layer 11B formed on the positive electrode substrate in a region excluding the one end 10A.

On the other hand, the negative electrode 13 includes a negative electrode substrate (in this embodiment, the negative electrode current collector foil 13A) and the negative electrode mixture layer 13B formed on the negative electrode substrate in a region excluding the other end 10B.

The positive electrode substrate has, at the one end 10A, the unformed portion 11E in which the positive electrode mixture layer 11B is not formed, and the negative electrode substrate has, at the other end 10B, the unformed portion 13E in which the negative electrode mixture layer 13B is not formed.

The current collectors 7 are connected respectively to at least part of the linear portions S in the unformed portion 11E of the positive electrode 11 at the one end 10A and to at least part of the linear portions S in the unformed portion 13E of the negative electrode 13 at the other end 10B.

The one end 10A in the positive electrode 11 has a length greater than the winding length, and/or the other end 10B in the negative electrode 13 has a length greater than the winding length.

According to the non-aqueous electrolyte secondary cell 1 of this embodiment, the one end 10A in the positive electrode 11 at which the unformed portion 11E is located has a length greater than the winding length, and the linear portions S in the unformed portion 11E are connected to the corresponding current collector 7. Therefore, waves (creases) occur in the curved portions R of the electrode assembly 10 in the unformed portion 11E.

Likewise, the other end 10B in the negative electrode 13 at which the unformed portion 13E is located has a length greater than the winding length, and the linear portions S in the unformed portion 13E are connected to the corresponding current collector 7. Therefore, waves (including creases, wrinkles, or the like) occur in the curved portions R of the electrode assembly 10 in the unformed portion 13E.

Figure 12:
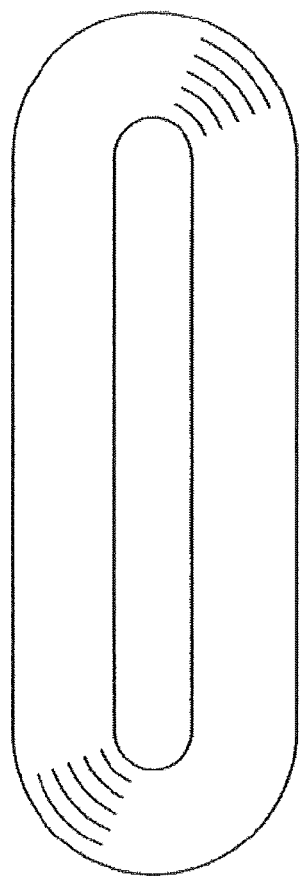
FIG. 12 is a schematic diagram of an electrode assembly according to a comparative example.

When such waves can be generated in the curved portions R in the positive electrode 11 and/or the negative electrode 13, the gaps between the positive electrode 11 and the separator 12 and/or the gaps between the negative electrode 13 and the separator 12 are increased as compared to an electrode assembly according to the comparative example shown in FIG. 12 (an electrode assembly including a positive electrode in which one end has a length equal to the winding length and a negative electrode in which the other end has a length equal to the winding length), thereby enhancing the penetration of the electrolyte solution through the gaps.

Therefore, even in the case where a portion of the electrode assembly 10 which serves to absorb the electrolyte solution 3 deforms due to a stress applied to the non-aqueous electrolyte secondary cell 1 and the components thereof, for example, when the electrode assembly 10 is inserted into the housing 2, or when an impact is applied to the non-aqueous electrolyte secondary cell 1, channels for supplying the electrolyte solution 3 can be easily secured.

Accordingly, the supply shortages of the electrolyte solution 3 to the electrode assembly 10 can be suppressed, and therefore increases of the electrical resistance in the non-aqueous electrolyte secondary cell 1 can be suppressed.

Further, the method for producing the non-aqueous electrolyte secondary cell 1 of this embodiment includes a step of preparing the positive electrode 11 including a positive electrode substrate (in this embodiment, the positive electrode current collector foil 11A) and the positive electrode mixture layer 11B formed on the positive electrode substrate in a region excluding an end edge (in this embodiment the one end 11C) on one side in the direction of the winding axis of the positive electrode substrate.

Further, the method for producing the non-aqueous electrolyte secondary cell 1 includes a step of preparing the negative electrode 13 including a negative electrode substrate (in this embodiment, the negative electrode current collector foil 13A) and the negative electrode mixture layer 13B formed on the negative electrode substrate in a region excluding an end edge (in this embodiment, the other end 13C) on the other side in the direction of the winding axis of the negative electrode substrate.

Further, the method for producing the non-aqueous electrolyte secondary cell 1 includes a step of forming the electrode assembly 10 in roll form having the curved portions R and the linear portions S continuous with the curved portions R by winding the positive electrode 11 and the negative electrode 13 with the separator 12 interposed therebetween.

Furthermore, the method for producing the non-aqueous electrolyte secondary cell 1 includes a step of forming the current collectors 7 so as to be connected respectively to the positive electrode 11 at the one end 10A in the direction of the winding axis A of the electrode assembly 10 and to the negative electrode 13 at the other end 10B in the direction of the winding axis A of the electrode assembly 10.

Further, the method for producing the non-aqueous electrolyte secondary cell 1 includes a step of housing the electrode assembly 10, the current collectors 7, and the electrolyte solution 3 into the housing 2.

In the step of forming the electrode assembly 10a, the winding is performed so that the unformed portion 11E, at one end edge (the one end 11C) of the positive electrode substrate, in which the positive electrode mixture layer 11B is not formed is located at the one end 10A, and the unformed portion 13E, at the other end edge (the other end 13C) of the negative electrode substrate, in which the negative electrode mixture layer 13B is not formed is located at the other end 10B.

In the step of forming the current collectors 7, the current collectors 7 are formed so as to be connected respectively to at least part of the linear portions S in the unformed portion 11E of the positive electrode 11 at the one end 10A and to at least part of the linear portions S in the unformed portion 13E of the negative electrode 13 at the other end 10B.

In the step of preparing the positive electrode 11, the positive electrode 11 in which the one end edge has a length greater than the winding length is prepared, and/or in the step of preparing the negative electrode 13, the negative electrode 13 in which the other end edge has a length greater than the winding length is prepared.

According to the method for producing the non-aqueous electrolyte secondary cell 1 of this embodiment, the positive electrode 11 in which the one end 10A at which the unformed portion 11E is located has a length greater than the winding length is prepared, and the linear portions S in the unformed portion 11E of the positive electrode 11 are connected to the corresponding current collector 7, thereby generating waves (including creases, wrinkles, or the like) in the curved portions R of the electrode assembly 10 in the unformed portion 11E.

Further, the negative electrode 13 in which the other end 13C at which the unformed portion 13E is located has a length greater than the winding length is prepared, and the linear portions S in the unformed portion 13E of the negative electrode 13 are connected to the corresponding current collector 7, thereby generating waves in the curved portions R of the electrode assembly 10 in the unformed portion 13E.

In this way, the gaps between the positive electrode 11 and the separator 12 and/or the gaps between the negative electrode 13 and the separator 12 are increased in the curved portions R by generating waves in the curved portions R in the positive electrode 11 and/or the negative electrode 13, thereby enhancing the penetration of the electrolyte solution through the gaps.

Therefore, even in the case where a portion of the electrode assembly 10 which serves to absorb the electrolyte solution 3 deforms due to a stress applied to the non-aqueous electrolyte secondary cell 1 and the components thereof, for example, when the electrode assembly 10 is inserted into the housing 2, or when an impact is applied to the non-aqueous electrolyte secondary cell 1, channels for supplying the electrolyte solution 3 can be easily secured.

Accordingly, the supply shortages of the electrolyte solution 3 to the electrode assembly 10 can be suppressed, and therefore increases of the electrical resistance in the non-aqueous electrolyte secondary cell 1 can be suppressed.

In the non-aqueous electrolyte secondary cell according to this embodiment, it is preferable that the one end 10A be arcuate so as to be concave toward the other end 10B in the positive electrode 11, and/or the other end 10B be arcuate so as to be concave toward the one end 10A in the negative electrode 13.

In the method for producing the non-aqueous electrolyte secondary cell 1 according to this embodiment, it is preferable that, in the step of preparing the positive electrode 11, the positive electrode substrate in which the one end edge (the one end 11C) in the unformed portion 11E is arcuate so as to be concave toward the other end edge (the other end 11D) on the opposite side of the unformed portion 11E be used, and/or in the step of preparing the negative electrode 13, the negative electrode substrate in which the other end edge (the other end 13C) in the unformed portion 13E is arcuate so as to be concave toward the one end edge (the one end 13D) on the opposite side of the unformed portion 13E be used.

This allows waves (creases or wrinkles) to occur effectively in the curved portions R of the electrode assembly 10 in the unformed portions 11E and 13E. Therefore, the supply shortages of the electrolyte solution 3 to the electrode assembly 10 can be further suppressed, so that the resistance increases can be further suppressed.

In the non-aqueous electrolyte secondary cell 1 of this embodiment, it is preferable that the ratio in the positive electrode substrate and/or the negative electrode substrate of the warpage C, as measured per meter in the direction orthogonal to the winding axis A (the winding direction E), with respect to the width W in the direction of the winding axis A (the distance from the one ends 11C and 13D to the respective other ends 11D and 13C) be at least 0.03 but not more than 0.10.

In the method for producing the non-aqueous electrolyte secondary cell of this embodiment, it is preferable that, in the step of preparing the positive electrode 11 and/or in the step of preparing the negative electrode 13, the ratio (C/W) in the positive electrode substrate and/or negative electrode substrate of the warpage C, as measured per meter in the direction orthogonal to the winding axis A, with respect to the width W in the direction of the winding axis A be at least 0.03 but not more than 0.10.

When the ratio C/W is at least 0.03, the gaps between the positive electrode 11 and the separator 12 and/or the gaps between the negative electrode 13 and the separator 12 are increased, thereby further facilitating the supply of the electrolyte solution 3. Therefore, the resistance increases due to the supply shortages of the electrolyte solution 3 can be further suppressed. When the ratio C/W is not more than 0.10, the gaps between the positive electrode 11 and the separator 12 and/or the gaps between the negative electrode 13 and the separator 12 are not excessively increased. Therefore, the resistance increases due to excessively increased gaps can be suppressed.

In this way, according to the non-aqueous electrolyte secondary cell 1 of this embodiment, the resistance increases can be further suppressed even with a predetermined amount of the electrolyte solution 3 by making the supply of the electrolyte solution effective. Therefore, reductions in weight of the cell and in cost thereof are also made feasible.

Embodiment 2

An electric storage system according to one embodiment of the present invention includes an electric storage device having one of the above-mentioned features and a control unit configured to control charge and discharge of the electric storage device.

The electric storage system of this embodiment includes the electric storage device in which the resistance increases are suppressed. Accordingly, the resistance increases are suppressed in the electric storage system.

Figure 13:
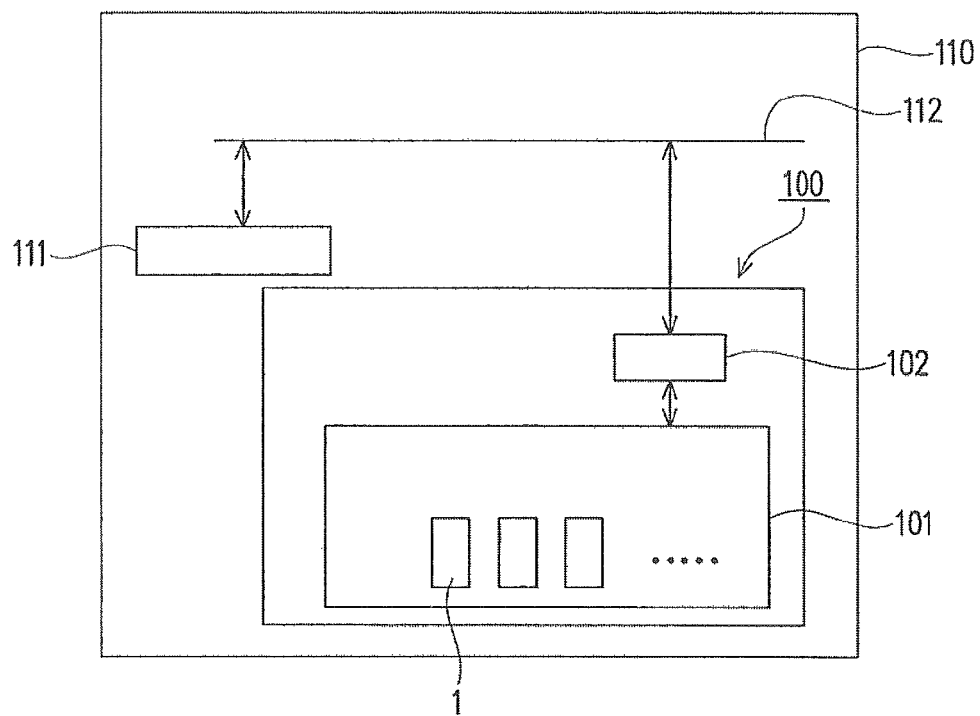
FIG. 13 is a schematic diagram showing an electric storage system according to Embodiment 2 of the present invention in a state of being mounted on a vehicle.

As shown in FIG. 13, an electric storage system 100 of this embodiment includes the non-aqueous electrolyte secondary cell 1 as the electric storage device of Embodiment 1, and a control unit 102 that controls charge and discharge of the non-aqueous electrolyte secondary cell 1. Specifically, the electric storage system 100 includes an electric storage module 101 having a plurality of non-aqueous electrolyte secondary cells 1, and the control unit 102 that performs charge and discharge of each non-aqueous electrolyte secondary cell at a high rate and controls the charge and discharge thereof.

For example, when the electric storage system 100 is mounted on a transportation 110 such as automobiles and trains, the control unit 102 and an integrated controller 111 that controls motors, etc., are connected to each other via a communication network 112 such as LAN, as shown in FIG. 13. The control unit 102 and the integrated controller 111 communicate with each other, and the electric storage system 100 is controlled based on the information obtained from the communication.

As has been described above, the electric storage system of this embodiment includes the non-aqueous electrolyte secondary cells 1 as the electric storage device of Embodiment 1 and the control unit 102 that controls the charge and discharge of the non-aqueous electrolyte secondary cells 1.

The electric storage system 100 of this embodiment includes an electric storage device capable of suppressing the resistance increases. Accordingly, the electric storage system 100 can suppress reductions in output power.

The method for producing the electric storage system 100 of this embodiment includes a step of producing an electric storage device by the method for producing the electric storage device of Embodiment 1 and a step of forming a control unit configured to control charge and discharge of the electric storage device.

EXAMPLES

In the following examples, effects of the ratio in the positive electrode substrate and/or the negative electrode substrate of the warpage C, as measured per meter in the direction orthogonal to the winding axis, with respect to the length (width W) in the direction of the winding axis were investigated.

Examples 1 to 10

In the following way, lithium ion secondary cells having different C/W ratios were produced.
<Positive Electrode>

$Li_{1.1}Ni_{0.33}Co_{0.33}Mn_{0.33}O_2$ as a positive electrode active material, acetylene black as a conductive additive, and PVDF as a binder were mixed at a mass ratio of 90:5:5, and N-methylpyrrolidone (NMP) as a solvent was added to this mixture. Thus, a positive electrode mixture was prepared. As shown in FIG. 7, this positive electrode mixture was applied onto both surfaces of an Al foil serving as the positive electrode current collector foil 11A in a region excluding one end edge in the direction of the winding axis. After drying, only the positive electrode mixture was compressed at a specific pressure using the roll press 31, as shown in FIG. 10. Next, the foil after the compression was cut into two along the winding direction E, as shown in FIG. 11. Thus, the positive electrode 11 including the positive electrode current collector foil 11A and the positive electrode mixture layer 11B formed on the positive electrode current collector foil 11A in a region excluding the one end 10A (the one end 11C) was produced. In the positive electrode 11, the one end edge (the one end 11C) had a length greater than the winding length.

<Negative Electrode>

Hard carbon as a negative electrode active material and PVDF as a binder were mixed at a mass ratio of 95:5, and NMP as a solvent was added to this mixture. Thus, a negative electrode mixture was prepared. As shown in FIG. 8, this negative electrode mixture was applied onto both surfaces of a Cu foil serving as the negative electrode current collector foil 13A in a region excluding the other end edge in the direction of the winding axis. After drying, only the negative electrode mixture was compressed at a specific pressure using the roll press 31, as shown in FIG. 10. Next, the foil after the compression was cut into two along the winding direction E, as shown in FIG. 11. Thus, the negative electrode 13 including the negative electrode current collector foil 13A and the negative electrode mixture layer 13B formed on the negative electrode current collector foil 13A in a region excluding the other end 10B (the other end 13C) was produced. In the negative electrode 13, the other end edge (the other end 13C) had a length greater than the winding length.

<Electrode Assembly>

As the separator 12, a microporous polyethylene film was prepared. The electrode assembly 10 in roll form having the curved portions R and the linear portions S continuous with the curved portions R was formed by winding the positive electrode 11 and the negative electrode 13 with the separator 12 interposed therebetween. In this step, the positive electrode 11, the negative electrode 13, and the separator 12 were wound so that the unformed portion 11E, at the one end edge (the one end 11C) of the positive electrode current collector foil 11A, in which the positive electrode mixture layer 11B was not formed was located at the one end 11C, and the unformed portion 13E, at the other end edge (the other end 13C) of the negative electrode current collector foil 13A, in which the negative electrode mixture layer 13B was not formed was located at the other end 13C.

<Current Collector>

One of the current collectors 7 was formed so as to be connected to the positive electrode 11 at the one end 10A in the direction of the winding axis A of the electrode assembly 10, and the other of the current collectors 7 was formed so as to be connected to the negative electrode 13 at the other end 10B in the direction of the winding axis A of the electrode assembly 10. Specifically, one of the current collectors 7 was formed so as to be connected to at least part of the linear portions S in the unformed portion 11E of the positive electrode current collector foil 11A at the one end 10A (the one end 11C) in the direction of the winding axis A, and the other of the current collectors 7 was formed so as to be connected to at least part of the linear portions S in the unformed portion 13E of the negative electrode current collector foil 13A at the other end 10B (the other end 13C) in the direction of the winding axis A.

<Assembling>

The electrode assembly 10 to which the current collectors 7 were attached was arranged within the body 2a of the housing 2. Subsequently, the current collectors 7 were welded respectively to the external terminals 21 of the cover 2b, and the cover 2b was attached to the body 2a.

Next, the electrolyte solution 3 was poured into the housing 2. The electrolyte solution 3 was prepared by dissolving $LiPF_6$ at a concentration of 1 mol/L in a mixed solvent of propylene carbonate (PC):dimethyl carbonate (DMC):ethyl methyl carbonate (EMC)=3:2:5 (volume ratio). Part of the electrolyte solution 3 was retained at the bottom of the housing 2 as excess electrolyte solution.

By performing the above-described steps, lithium ion secondary cells of Examples 1 to 10 were each produced. In the lithium ion secondary cells of Examples 1 to 10, the one end 10A in the positive electrode 11 had a length greater than the winding length, and the other end 10B in the negative electrode 13 had a length greater than the winding length.

Evaluation Method

The lithium ion secondary cells of Examples 1 to 10 were subjected to 1000 cycles of continuous charge and discharge with a constant current in the range from the lower limit of 2.5 V to the upper limit of 4.1 V at an environment of 45° C. for one hour. The resistance ratios after 1000 cycles were evaluated.

For each of Examples 1 to 10, the ratio (C/W) in the positive electrode current collector foil 11A and the negative electrode current collector foil 13A of the warpage C, as measured per meter in the direction orthogonal to the winding axis A (the winding direction E), with respect to the width W in the direction of the winding axis A was determined. Examples 1 to 10 each had the same value of the ratio (C/W) in the positive electrode current collector foil 11A and the negative electrode current collector foil 13A.

FIG. 14 shows the relationship between the ratio (C/W) and the resistance ratio.

Evaluation Results

As shown in FIG. 14, it was demonstrated that the ratio C/W of at least 0.03 but not more than 0.10 can more effectively suppress the resistance increases.

The embodiments and examples of the present invention have been described as above. It should be noted that the features of the embodiments and examples are intended to be combined as appropriate from the beginning. The embodiments and examples disclosed herein should be construed in all respects as illustrative but not limiting. The scope of the present invention is not indicated by the foregoing embodiments or examples but by the scope of the claims. The scope of the present invention is intended to include all the modifications equivalent in the sense and the scope to the scope of the claims.

What is claimed is:

1. An electric storage device, comprising:
   a housing;
   an electrode assembly in roll form housed in the housing, the electrode assembly being formed by winding a positive electrode, a negative electrode, and a separator disposed between the positive electrode and the negative electrode so as to have curved portions and linear portions continuous with the curved portions;
   current collectors housed in the housing, the current collectors being connected respectively to the positive electrode at one end of the electrode assembly in a direction of a winding axis of the electrode assembly and to the negative electrode at an other end of the electrode assembly in the direction of the winding axis of the electrode assembly; and
   an electrolyte solution housed in the housing,
   wherein the positive electrode includes a positive electrode substrate and a positive electrode mixture layer formed on the positive electrode substrate in a region excluding one end of the positive electrode substrate, wherein the negative electrode includes a negative electrode substrate and a negative electrode mixture layer formed on the negative electrode substrate in a region excluding an other end of the negative electrode substrate, wherein the positive electrode substrate has at its one end an unformed portion in which the positive electrode mixture layer is not formed, wherein the negative electrode substrate has at its other end an unformed portion in which the negative electrode mixture layer is not formed, wherein the current collectors are connected respectively to at least a part of the linear portions in the unformed portion of the positive electrode at the one end of the positive electrode and to at least part of the linear portions in the unformed portion of the negative electrode at the other end of the negative electrode, and wherein the one end in the positive electrode has a length greater than a winding length of the positive electrode, and/or the other end in the negative electrode has a length greater than a winding length of the negative electrode.

2. The electric storage device according to claim 1, wherein, in the positive electrode, the one end is arcuate so as to be concave toward the other end, and/or in the negative electrode, the other end is arcuate so as to be concave toward the one end.

3. The electric storage device according to claim 1, wherein a ratio in the positive electrode substrate and/or the negative electrode substrate of a warpage, as measured per meter in a direction orthogonal to the winding axis, with respect to a width in the direction of the winding axis is at least 0.03 but not more than 0.10.

4. An electric storage system comprising:
the electric storage device according to claim 1; and
a control unit configured to control charge and discharge of the electric storage device.

5. A method for producing an electric storage device, comprising:
preparing a positive electrode including a positive electrode substrate and a positive electrode mixture layer formed on the positive electrode substrate in a region excluding one end edge of the positive electrode substrate in a winding direction of the positive electrode substrate;
preparing a negative electrode including a negative electrode substrate and a negative electrode mixture layer formed on the negative electrode substrate in a region excluding an other end edge of the negative electrode substrate in the winding direction of the negative electrode substrate;
forming an electrode assembly in roll form having curved portions and linear portions continuous with the curved portions by winding the positive electrode and the negative electrode with a separator interposed therebetween;
forming current collectors so as to be connected respectively to the positive electrode at one end of the electrode assembly in a direction of a winding axis of the electrode assembly and to the negative electrode at an other end of the electrode assembly in the direction of the winding axis of the electrode assembly; and
housing the electrode assembly, the current collectors, and the electrolyte solution into the housing, wherein, in the forming of the electrode assembly, the winding is performed so that an unformed portion, formed at the one end edge of the positive electrode substrate, in which the positive electrode mixture layer is not formed is located at the one end of the electrode assembly, and an unformed portion, formed at the other end edge of the negative electrode substrate, in which the negative electrode mixture layer is not formed is located at the other end of the electrode assembly, wherein, in the forming of the current collectors, the current collectors are formed so as to be connected respectively to at least part of the linear portions in the unformed portion of the positive electrode substrate at the one end and to at least part of the linear portions in the unformed portion of the negative electrode substrate at the other end, and wherein, in the preparing of the positive electrode, the positive electrode in which the one end edge has a length greater than a winding length of the positive electrode is prepared, and/or in the preparing of the negative electrode, the negative electrode in which the other end edge has a length greater than a winding length of the negative electrode is prepared.

6. The method for producing an electric storage device according to claim 5, wherein, in the preparing of the positive electrode, the positive electrode substrate in which the one end edge in the unformed portion is arcuate so as to be concave toward the other end edge on an opposite side of the unformed portion is used, and/or in the preparing of the negative electrode, the negative electrode substrate in which the other end edge in the unformed portion is arcuate so as to be concave toward the one end edge on an opposite side of the unformed portion is used.

7. The method for producing an electric storage device according to claim 5, wherein, in the preparing of the positive electrode and/or the preparing of the negative electrode, a ratio in the positive electrode substrate and/or the negative electrode substrate of a warpage, as measured per meter in a direction orthogonal to the winding axis, with respect to a width in the direction of the winding axis is at least 0.03 but not more than 0.10.

8. A method for producing an electric storage system, comprising:
producing an electric storage device using the method for producing an electric storage device according to claim 5; and
forming a control unit configured to control charge and discharge of the electric storage device.

9. The method for producing an electric storage device according to claim 5, wherein, in the preparing of the positive electrode, the positive electrode in which the one end edge has the length greater than the winding length of the positive electrode is prepared, and in the preparing of the negative electrode, the negative electrode in which the other end edge has the length greater than the winding length of the negative electrode is prepared.

10. The method for producing an electric storage device according to claim 5, wherein the winding length of the positive electrode includes a length of the positive electrode in a longitudinal direction of the positive electrode.

11. The method for producing an electric storage device according to claim 10, wherein the winding length of the negative electrode includes a length of the negative electrode in a longitudinal direction of the negative electrode.

12. The method for producing an electric storage device according to claim 5, wherein, in the preparing of the positive electrode, the positive electrode substrate in which the one end edge in the unformed portion is arcuate so as to be concave toward the other end edge on an opposite side of the unformed portion is used while the one end edge extends in a longitudinal direction of the positive electrode.

13. The method for producing an electric storage device according to claim 12, wherein, in the preparing of the negative electrode, the negative electrode substrate in which the other end edge in the unformed portion is arcuate so as to be concave toward the one end edge on an opposite side of the unformed portion is used while the other end edge in the unformed portion extends in a longitudinal direction of the negative electrode.

14. The electric storage device according to claim 1, wherein the one end in the positive electrode has the length greater than the winding length of the positive electrode, and the other end in the negative electrode has the length greater than the winding length of the negative electrode.

15. The electric storage device according to claim 1, wherein the winding length of the positive electrode includes a length of the positive electrode in a longitudinal direction of the positive electrode.

16. The electric storage device according to claim 15, wherein the winding length of the negative electrode includes a length of the negative electrode in a longitudinal direction of the negative electrode.

17. The electric storage device according to claim 1, wherein, in the positive electrode, the one end is arcuate so as to be concave toward the other end while extending in a longitudinal direction of the positive electrode.

18. The electric storage device according to claim 17, wherein, in the negative electrode, the other end is arcuate so as to be concave toward the one end while extending in a longitudinal direction of the negative electrode.

19. An electric storage device, comprising:
a housing;
an electrode assembly housed in the housing, the electrode assembly being formed by winding a positive electrode, a negative electrode, and a separator disposed between the positive electrode and the negative electrode;
current collectors housed in the housing, the current collectors being connected respectively to the positive electrode at one end of the electrode assembly in a direction of a winding axis of the electrode assembly and to the negative electrode at an other end of the electrode assembly in the direction of the winding axis of the electrode assembly; and
an electrolyte solution housed in the housing,
wherein the positive electrode includes a positive electrode substrate and a positive electrode mixture layer formed on the positive electrode substrate in a region excluding one end of the positive electrode substrate,
wherein the negative electrode includes a negative electrode substrate and a negative electrode mixture layer formed on the negative electrode substrate in a region excluding an other end of the negative electrode substrate,
wherein one end of the positive electrode substrate is exposed outside the positive electrode mixture layer,
wherein an other end of the negative electrode substrate is exposed outside the negative electrode mixture,
wherein the current collectors are connected respectively to the electrode assembly in an exposed portion of the positive electrode at the one end of the positive electrode and to an exposed portion of the negative electrode at the other end of the negative electrode, and
wherein the one end in the positive electrode has a length greater than a winding length of the positive electrode.

20. The electric storage device according to claim 19, wherein, the other end in the negative electrode has a length greater than a winding length of the negative electrode.

* * * * *